3,223,678
CHAIN SHORTENING OF POLYCARBONATE RESINS USING MONOETHANOLAMINE OR MORPHOLINE AS THE SHORTENING AGENT

Nicholas C. Bolgiano, Lancaster County, Pa., assignor to Armstrong Cork Company, Lancaster, Pa., a corporation of Pennsylvania
No Drawing. Filed Dec. 7, 1964, Ser. No. 416,638
2 Claims. (Cl. 260—47)

This application is a continuation-in-part of application Serial No. 35,898, filed June 14, 1960, and now abandoned.

This invention relates generally to polycarbonate resins, and more particularly to a method of adjusting the molecular weight of a polycarbonate resin. Still more particularly the invention relates to a method of treating polycarbonate resins in solution to modify the resins for use in certain applications.

A polycarbonate resin as made or purchased may not have a suitable molecular weight for certain uses. For example, the molecular weight may be too high for use in film-forming compositions in the nature of lacquers. It is the primary object of the present invention to present a method whereby this large molecular weight may be reduced in a controlled manner to produce the desired molecular weight range. It is a further object of the present invention to present a method for converting a polycarbonate resin which will not form a dry-bright coating to a polycarbonate which will form a dry-bright coating.

These objects are accomplished by dissolving a polycarbonate resin in an inert solvent therefor. The polycarbonate is the reaction product of phosgene and a bisphenol selected from the group consisting of 2,2-bis-(4 hydroxyl phenyl) propane, the methyl ester of 4,4-bis-(4 hydroxyl phenol) pentanoic acid, the ethyl ester thereof, and the butyl ester thereof. The dissolved polycarbonate resin is then caused to react with an amine by adding to the polycarbonate solution an amine selected from the group consisting of monoethanolamine and morpholine.

The polycarbonates to be used as starting materials in the present invention are those polycarbonates enumerated above which are prepared by methods well-known in the art. The manufacture of the polycarbonate resins themselves forms no part of this invention.

The monoethanolamine or the morpholine is reacted with the polycarbonate simply by adding the particular amine to a solution of the polycarbonate resin in a solvent inert to the amine and the resin. The solvents may be the chlorinated hydrocarbons such as methylene chloride, ethylene dichloride, dichloroethylene, and chlorobenzene. Dioxane may be used as may dimethyl formamide and any of the inert polycarbonate resin solvents. The organic amines appear to break the polycarbonate chain at the carbonate linkage to form a group having the structure

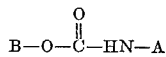

wherein B is the residue of the polycarbonate chain and A is the residue of the organic amine. The balance of the polycarbonate chain retains its integrity, becoming hydroxyl terminated at the point where scission has taken place.

Reaction is accomplished simply by adding the requisite amine to the polycarbonate solution. Heating is not required. As soon as the amine is added, an exothermic reaction immediately occurs, and the reaction goes to completion in a very short time, a few minutes generally being sufficient. Although warming of the reaction medium to temperatures short of boiling of the solvent could readily be carried out if desired, such as not necessary; room temperatures of 65°–95° F. suffice for almost all purposes.

One of the great advantages of the present invention is that the molecular weight of the original polycarbonate resin may be reduced to any desired usable value by simply controlling the amount of organic amine to be added to the solution. Chain shortening occurs with as little as 0.1% by weight of amine based on the weight of polycarbonate plus amine. Larger amounts cause greater scission and produce polycarbonate reaction products having increasingly lower molecular weights. About 20% by weight amine based on the weight of the mixture will be the maximum used. As a rough rule of thumb, each 1% by weight by the polycarbonate-amine mixture will reduce the molecular weight of the polycarbonate by roughly 20%.

The resulting amine-modified polycarbonates are frequently more desirable than the unmodified polycarbonates in certain applications. For example, polycarbonates modified with the defined amines can be processed more easily than the starting polycarbonates to give stable emulsions of the type used in dry-bright floor finishes. The modified polycarbonates may more easily be suspended in aqueous mediums.

The following examples illustrate several embodiments of the present invention. All parts are by weight unless otherwise stated.

Example 1

Ffteen parts of polycarbonate was dissolved in 40 parts of methylene chloride. The polycarbonate used had a molecular weight of 54,000 and was formed by the reaction in a solvent of phosgene on 2,2-bis-(4 hydroxyl phenyl) propane. To the mixture was added 0.5 part morpholine. A slight warming of the solution was noticed immediately after the addition of the morpholine. Activity appeared to have stopped at the end of one hour, at which time there were added, during stirring, 3 parts of triethanolamine, 3 parts oleic acid, 2.1 parts of alkylphenoxy polyoxyethylene ethanol wetting agent (Igepal CO 990), and 5 parts of a polyester plasticizer which was a polybutylene adipate modified with a small amount of tetrahydrophthalic anhydride. To the vigorously stirred mixture was added 105 parts of water.

The resulting emulsion when spread on a smooth-surface plastic flooring dried to a bright, dry finish.

An identical composition prepared with the starting polycarbonate itself without having been modified with morpholine did not produce a bright finish; the finish was powdery and discontinuous.

Example 2

A series of runs was made containing the polycarbonate of Example 1 dissolved in 100 parts of methylene chloride. To each solution was added a different amount of monoethanolamine. The mixtures were stirred and after at least one hour the solvent was removed and the molecular weights of the polycarbonates were determined. Following are the data:

| Run number | Parts polycarbonate | Parts monoethanolamine | Percentage by weight monoethanolamine | Molecular weight |
|---|---|---|---|---|
| 1 | 10.0003 | 0 | 0 | 54,000 |
| 2 | 9.9965 | 0.0199 | 0.2 | 47,525 |
| 3 | 10,0000 | 0.0417 | 0.4 | 45,545 |
| 4 | 10.0007 | 0.059 | 0.6 | 45,050 |
| 5 | 10.0044 | 0.0809 | 0.8 | 44,500 |
| 6 | 10.0003 | 0.0996 | 1.0 | 43,800 |

Example 3

A polycarbonate made from the reaction of phosgene with the ethyl ester of 4,4-bis-(4 hydroxyl phenyl) pentanoic acid was reacted in methylene chloride solution with 5 weight percent morpholine based on the weight of the polymer. After isolation of the polymer by removal of the solvent, the following emulsion formulation gave a dry-bright finish on plastic flooring: 10 parts morpholine-modified polymer, 10 parts ethyl propionate, 0.5 part sodium alkyl sulfate wetting agent (Tergitol Anionic 7), 0.5 part aromatic sulfonic acid salt wetting agent (Santomerse 85), and 40 parts water.

Example 4

A polycarbonate made from the reaction of phosgene with the butyl ester of 4,4-bis-(4 hydroxyl phenyl) pentanoic acid was reacted in methylene chloride solution with 5.9 percent morpholine based on the weight of the ester plus morpholine (a 16:1 weight ratio). The solvent was then evaporated off, and the remaining modified polycarbonate product was used in producing a dry-bright floor polish emulsion. The product formed a continuous glossy film when applied to a floor covering. When the unmodified butyl ester was used in the formulation, no continuous glossy film resulted.

Example 5

A polycarbonate made from the reaction of phosgene with the methyl ester of 4,4-bis-(4 hydroxyl phenyl) pentanoic acid was reacted in methylene chloride solution with 5 weight percent morpholine based on the weight of the polycarbonate. The resulting modified product had a reduced melting point of 71° C. as compared with the melting point of the unimodified polycarbonate. When the same polycarbonate was modified with 2.5 weight percent morpholine based on the weight of the polycarbonate, the resulting modified polycarbonate melted at 76° C.

I claim:

1. The method of converting a polycarbonate which will not form a film on drying an emulsion thereof to a polycarbonate which will form such a film by reducing the molecular weight of the polycarbonate in a controlled manner which comprises dissolving in an inert solvent therefor a polycarbonate which is the reaction product of phosgene and a bis-phenol selected from the group consisting of 2,2-bis-(4 hydroxyl phenyl) propane, the methyl ester of 4,4-bis-(4 hydroxyl phenyl) pentanoic acid, the ethyl ester thereof, and the butyl ester thereof, adding to the resulting solution an organic amine selected from the group consisting of monoethanolamine and morpholine in an amount of 0.1–20% by weight of the polycarbonate-amine mixture, thereby causing chain scission of said polycarbonate.

2. The method according to claim 1 wherein said solvent is methylene chloride.

No references cited.

WILLIAM H. SHORT, *Primary Examiner.*